Sept. 6, 1966 W. C. BEACH 3,270,488

LIGHTWEIGHT HARNESS

Filed April 28, 1964 3 Sheets-Sheet 1

INVENTOR.
WILLARD C. BEACH
BY
[signature]
ATTORNEY

Sept. 6, 1966 W. C. BEACH 3,270,488

LIGHTWEIGHT HARNESS

Filed April 28, 1964 3 Sheets-Sheet 2

INVENTOR.
WILLARD C. BEACH

BY

ATTORNEY

LIGHTWEIGHT HARNESS

Filed April 28, 1964 3 Sheets-Sheet 3

INVENTOR.
WILLARD C. BEACH
BY [signature]
ATTORNEY

United States Patent Office 3,270,488
Patented Sept. 6, 1966

3,270,488
LIGHTWEIGHT HARNESS

Willard C. Beach, R.D. 1, Glen Rock, Pa.

Filed Apr. 28, 1964, Ser. No. 363,118
4 Claims. (Cl. 54—39)

This invention pertains to lightweight harness, and, more particularly, to lightweight harness especially adapted for horses engaged in harness racing, but is not restricted to such use.

Since time immemorial, harness for horses of all types and for all uses has been made from leather. Certain elements of harness used on so-called work horses have been made from other materials, such as wood usually reinforced with metal, metal chains, and various items of metal hardware, such as buckles, clevises, guides and loops, etc., but the major portions of the harness have been made from leather.

In order to preserve leather harness in good condition, it must be treated relatively frequently with various types of preserving preparations, such as oils and greases of suitable nature. Even when care is exercised in treating leather harness to preserve it, nevertheless, it is subject to aging and natural deterioration, especially resulting from absorption of moisture, such as rain and the like, but, more particularly, from the sweating of the animals with which it is used.

Another characteristic of leather harness is that, especially to sustain certain tensile stresses to which elements of the harness are to be subjected, it is necessary to have harness elements such as traces, breast bands, saddles and girths, which support shafts of the vehicles pulled by the horses, and certain other elements of the harness made from leather, of appreciable width and thickness. As a result, leather harness, in general, is quite heavy. Also, being susceptible to ready absorption of moisture, either from weather conditions or sweating of the animals upon which the harness is used, such absorbed moisture greatly adds to the weight of the harness and, correspondingly, to the load the horse, for example, must carry.

Considering particularly harness of the type used on horses engaged in sulky or harness racing, also known as trotting racing, it is advantageous to use harness of as light a weight as possible, thereby enabling the horse to devote as much of its energy as possible to trotting and pulling a sulky and rider around the track, as distinguished from carrying dead weight in the form of harness. Racing harness of the type commonly employed in trotting racing usually consists of such major items as a bridle, breast collar, traces, saddle, girths, and lines or reins. The major portion of these elements is carried by the horse primarily in the region of its forelegs and upon its head.

Considering the fact that a race horse primarily achieves forward movement through his hind legs, whereas his forelegs primarily simply are for purposes of supporting its head and forward portion of its body somewhat as a prop, it will be seen that, if the weight of racing harness could materially be reduced, especially by a very substantial fraction of the normal weight of leather harness, a horse could employ much more of its energy to secure forward movement than by consuming at least a reasonable portion of that energy to supporting dead weight in the form of harness.

A popular commercial type of racing harness made from leather and having the normal metal bracings and other metal hardware items, even though considered to be of a so-called lightweight nature, nevertheless weighs, at the least, approximately 17 lbs. and usually more. It also is possible for such harness to substantially double its weight when thoroughly saturated by rain or perspiration, thereby greatly adding to the burden which a race horse must carry as dead weight, in addition to devoting its energy to propelling its own weight and pulling a sulky and rider.

It is the principal object of the present invention to provide a truly lightweight harness in which substantially no leather of any kind is employed, but, rather, tensile strength primarily is afforded by utilizing a ply-type fabric woven from synthetic resin fibers or filaments of high tensile strength and stitched to secure together the plies and maintain certain elements of harness made therefrom in suitable shapes of substantially permanent form.

Another object of the invention is to provide harness, of the type referred to in the preceding object, in which the fabrication of the harness includes substantially no auxiliary stiffening or shaping elements, especially in the saddle of a set of racing harness which supports the girth and guide loops for the shafts of the sulky or any other type of vehicle to be pulled by a horse upon which harness embodying the present invention is mounted.

A further object of the invention is to minimize the use of metallic hardware elements in harness of the type referred to in the preceding objects, such hardware being substantially entirely restricted to the use of metal buckles and, whereas conventional leather harness usually has holes punched or cut therethrough which actually sever the fibers of the leather and correspondingly reduce the tensile strength of the leather in order to provide holes to receive the tongues of buckles, the present invention contemplates the formation of holes therein to receive buckle tongues by deforming or displacing certain of the woven filaments or strands from which the fabric is woven, rather than sever them, and somewhat bunch the fibers around a tongue-receiving hole formed by working a pointed element through the plies which are fastened together to form certain harness elements.

Ancillary to the foregoing object, it is a further object to form such tongue-receiving holes preferably by a heated pointed tool, which not only rearranges certain of the woven filaments in the vicinity of the hole but, in the event any limited amount of incidental severance of fibers occurs, the heated element is capable of melting or fusing such fibers immediately surrounding the hole so as not only to preserve the longitudinal strength of the harness element, but also provide a permanent shape for the hole and thereby facilitate the reception of a tongue of a buckle therethrough.

Still another object of the invention is to provide on certain harness components various guide loops formed from fabric of the type referred to in the preceding objects, in lieu of metallic guide members for reins and the like, the formation of such guide bands or loops being accomplished by stitching plies of fabric which provides strength while not increasing the weight of the harness by any readily measurable amount.

One further object of the invention is to utilize, in the formation of the various harness elements, fabric made from synthetic resin fibers and filaments which preferably is of highly moisture-resistant nature due to its having a very low coefficient of moisture absorption and, if desired, the ability of the harness to resist absorption of moisture is further implemented, in accordance with the principles of the invention, by either completely enclosing the synthetic resin fabric members which provide tensile strength within a sheath or covering of lightweight, pliable material made from synthetic resin or the like, which is substantially completely impervious to the passage of moisture therethrough, or by coating and/or saturating the synthetic resin fabric plies which comprise the tensile strength means of the harness with an appropriate waterproofing solution applied by spraying, brushing, or dipping, as desired.

Details of the foregoing objects and of the invention, as well as other objects thereof, are set forth in the following specification and illustrated in the accompanying drawings comprising a part thereof.

Figure 7:
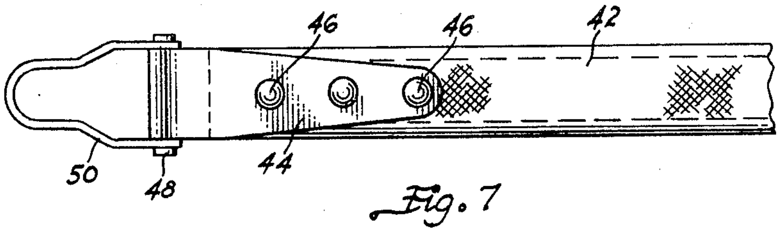
Figure 8:
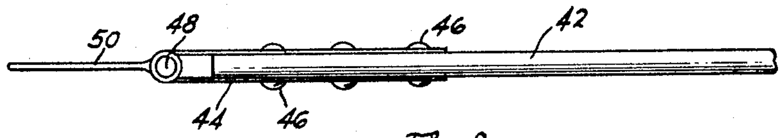

FIGS. 7 and 8 respectively are fragmentary plan and side elevational views of one end of a harness trace embodying the principles of the present invention and showing one method of securing a metallic clevis thereto in the event such metallic clevis is needed or desired.

Figure 9:
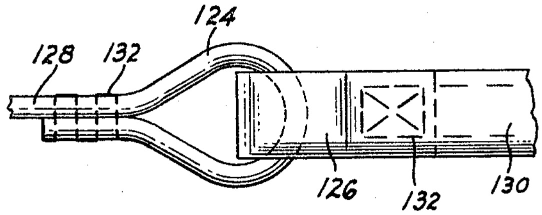

FIG. 9 is a fragmentary elevation of an exemplary means for connecting the 2 strap-like elements together by forming interengaging loops on adjacent ends of the two connected elements, the ends of said loops being secured by stitching to the intermediate portions of the elements.

Figure 10:
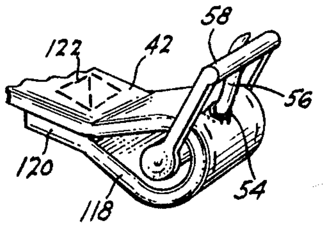

FIG. 10 is a fragmentary perspective view illustrating one exemplary means for connecting a metallic buckle to one end of a strap-like element formed in accordance with the principles of the present invention and providing a loop to receive the metallic buckle and a hole through which the buckle tongue projects.

Figure 11:
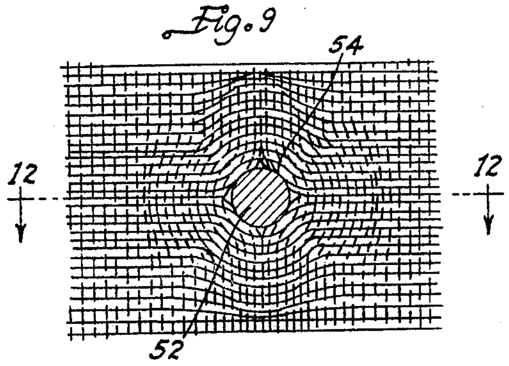

FIG. 11 is an exaggerated, somewhat diagrammatic fragmentary view illustrating one method of rearranging the fibers or filaments from which the fabric of the tensile members is rearranged, rather than being severed, to provide a hole to receive the tongue of a buckle, such as shown in FIG. 10.

Figure 12:
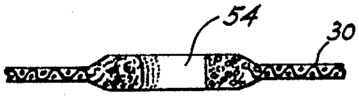

FIG. 12 is an exemplary, fragmentary sectional view taken on the line 12—12 of FIG. 11.

Figure 13:
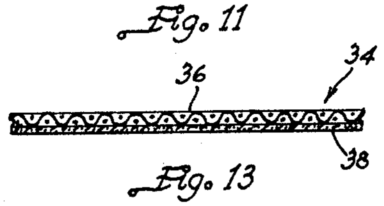

FIG. 13 is an exaggerated fragmentary sectional view of one type of waterproofing covering material of the type employed in the harness elements illustrated in FIGS. 2–6.

Figure 14:
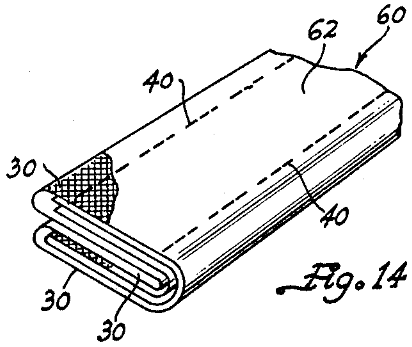

FIG. 14 is a perspective view of a fragmentary end portion of another embodiment of harness element in which 8 plies of tensile textile fabric are folded so as to provide no raw edges on the exterior thereof and the stitched assembly of plies is coated with an appropriate liquid waterproofing compound.

Figure 15:
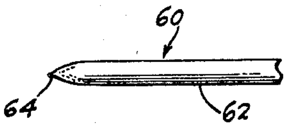

FIG. 15 is a side elevation of a fragmentary end portion of harness element of the type illustrated in FIG. 14 and in which the outer end of the element is pinched so as to seal the same by the waterproofing compound applied thereto.

Figure 16:
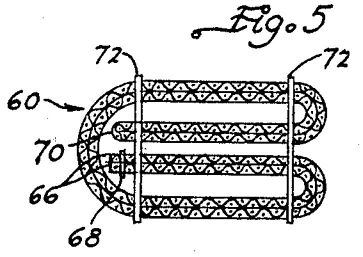

FIG. 16 is an exaggerated cross-sectional view of still another embodiment of harness element formed by folding upon itself a number of times a strip of textile tensile fabric.

Figure 1:
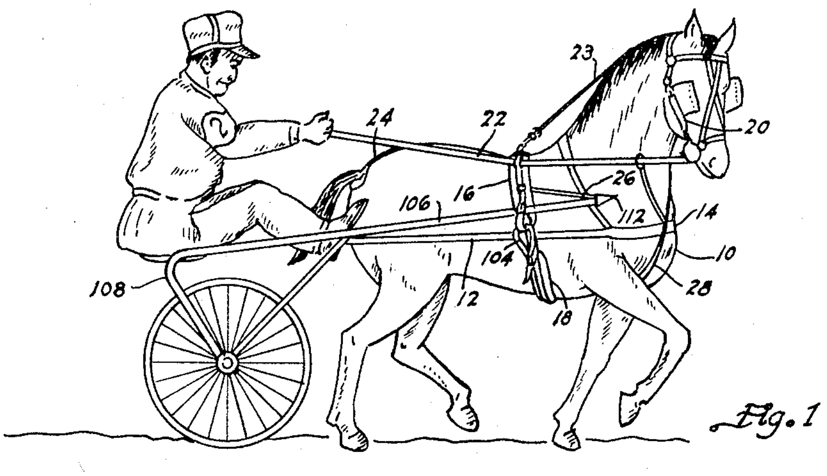
FIG. 1 is a side elevation of an exemplary racing sulky hitched to a trotting horse upon which is mounted a set of harness embodying the principles of the present invention.
Figures 17, 18:
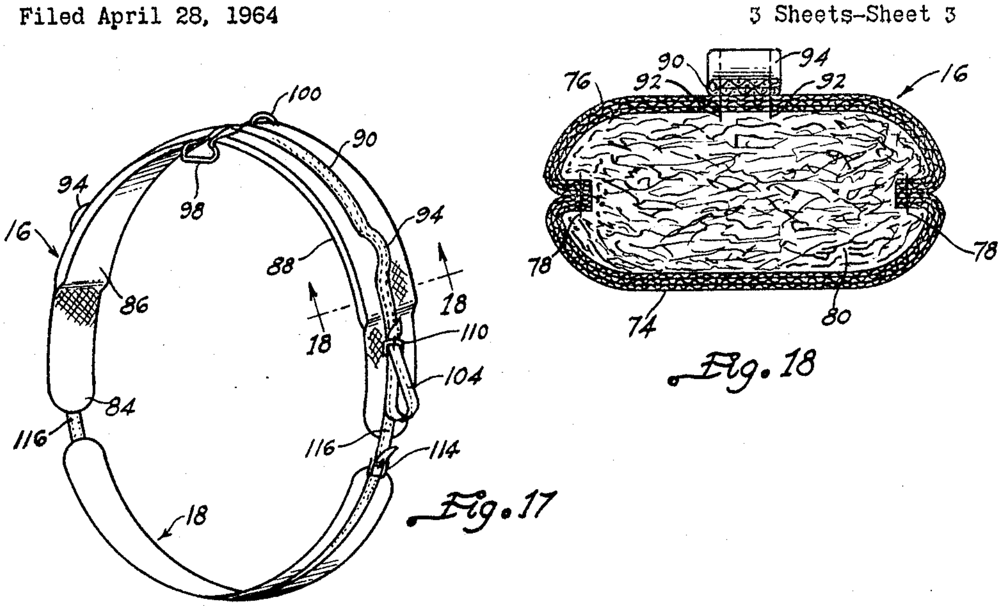

FIG. 17 is a perspective view of the saddle and girth of the exemplary complete set of harness illustrated in FIG. 1 and showing particularly various supporting and attaching loop means formed from strap-like bands comprising tensile textile fabric stitched to the saddle member for connection thereto.

FIG. 18 is an enlarged exemplary cross-sectional view, as seen on the line 17—17 of FIG. 17 and showing certain internal construction of the saddle member and strap-like member connected thereto.

Figure 19:
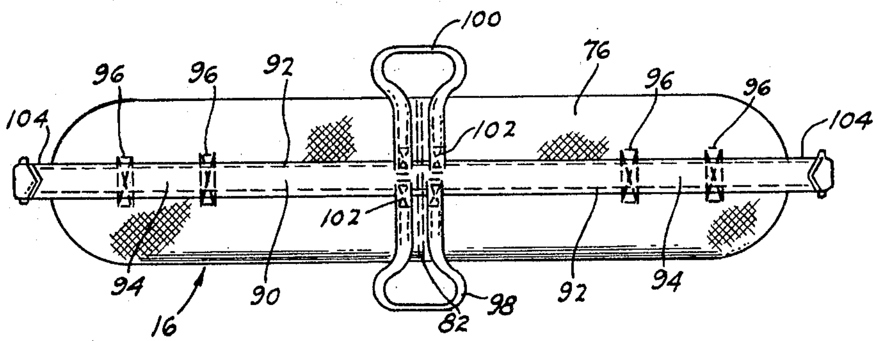

FIG. 19 is a top plan view of the saddle member and strap-like element supported thereby, illustrated on a larger scale than employed in FIG. 17.

Figure 20:
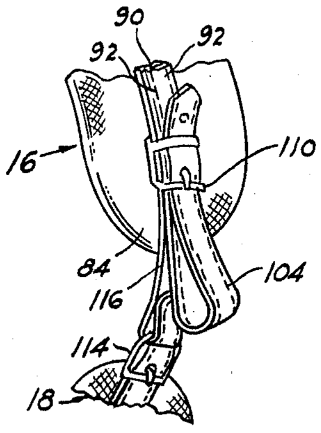

FIG. 20 is a perspective fragmentary view of the lower portion of one end of the saddle member and the upper portion of the girth which is connected thereto, together with loop means for supporting the shaft of a sulky or the like and illustrating details of said elements on a larger scale than employed in FIG. 17.

Figure 21:
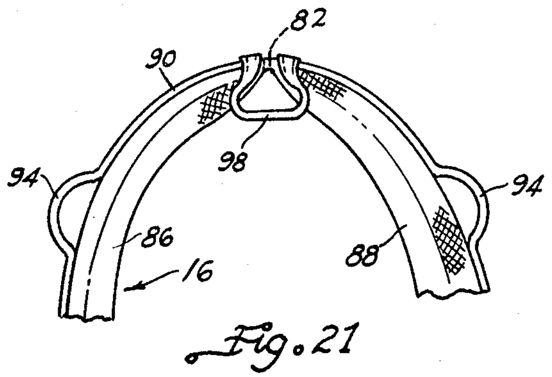

FIG. 21 is a fragmentary edge view of the upper portion of the saddle member and illustrating the central hinge portion thereof.

Referring to the drawings, there is illustrated in FIG. 1 an exemplary racing sulky hitched to a trotter race horse upon which is mounted a set of harness formed from elements incorporating the principles of the present invention. It is to be understood, however, that, while the present invention embodies as one of its primary features vastly reduced weight as compared with conventional leather-type harness now in use, thus being particularly suitable for sulky or trotting racing horses, other types of harness may be formed from elements made in accordance with the present invention. Therefore, the invention is not be restricted to racing harness, but is usable, if desired, at least to a large extent, in other types of harness and especially that of a more utilitarian nature than racing harness.

The set of harness illustrated on the horse 10 shown in FIG. 1 comprises a pair of traces 12, a breast band or collar 14, a saddle 16, a girth 18, a bridle 20, lines or reins 22, a check rein 23, a crupper strap 24, shaft tugs 26 and martingale 28. All of these elements of the set of harness may be formed substantially entirely from multiple plies of fabric which preferably is woven from synthetic resin fibers or filaments having very great tensile strength in comparison with the cross-sectional dimensions of the same. Suitable types of fabrics of this nature are manufactured and sold under such tradenames as "nylon," "Dacron," and the like. Fabric of this type of a thickness substantially equal to that used in conventional sheeting made from cotton has a tensile strength of approximately 1000 lbs. per inch of width of said fabric. By way of further example, a folded strip of such material ½" wide and comprising 8 plies will sustain a tensile load of approximately 4000 lbs. The cross-sectional dimension of such ply-type material is far less than a strip of conventional leather ½" wide and used in harness and has a far greater tensile strength than such leather strapping of conventional harness thickness. Stated another way, in comparison with an 8 ply, ½" wide textile fabric strip which will sustain a test load of approximately 4000 lbs, a leather strap made of best grade cowhide would have to be at least five times greater in cross-sectional dimensions.

The various harness members of the examplary set illustrated in FIG. 1 may be formed from a number of different embodiments of textile-type material woven from synthetic resin fibers and filaments of the type referred to above and folded in various ways to produce different widths and thicknesses, of correspondingly different tensile strengths, depending upon the size and strength required by any particular harness member. However, preferably to be in keeping with the conventional appearance of leather harness, especially as to width, it is preferred that the various elements of the set of harness shown in FIG. 1, where possible, be comparable to that employed in conventional leather harness. By way of specific example, leather lines or reins usually are approximately 1" wide. Accordingly, several different embodiments of lines or reins composed of folded textile synthetic fiber material may be employed and prepared in such manner that the product is substantially 1" in width, but noticeably thinner than conventional leather lines.

One suitable embodiment of construction for harness members of the type described above and embodying the principles of the present invention is shown in exaggerated manner in FIGS. 2–5, said figures respectively representing successive steps in the formation of the composite product. This particular embodiment is of the type employing multiple plies of so-called tensile material, i.e., material intended to supply tensile strength solely, but preferably also being resistant to the absorption of moisture, and such plies being covered by a waterproofing sheath, preferably formed from flexible synthetic material substantially impervious to the passage of moisture, such as rain, perspiration, etc.

Referring to FIGS. 2–5 in detail, the first step in the formation of a composite harness element comprises folding a strip of desired width of tensile textile fabric 30 once upon itself to form 2 overlapping plies and connecting said plies firmly by parallel rows of stitching 32. The stitched tensile means is placed upon one surface of the waterproofing sheath material 34, one embodiment of which comprises a woven textile layer 36 to which a coating 38 of suitable synthetic resin, which is readily pliable and substantially impervious to the passage of moisture, is firmly united. Such coating also preferably is highly resistant to injury from abrasion. Further, the synthetic textile material from which the tensile fabric 30 is formed preferably is of such nature that it has a very low coefficient of moisture absorption and resists any tendency to retain moisture if subjected thereto.

Figure 2:
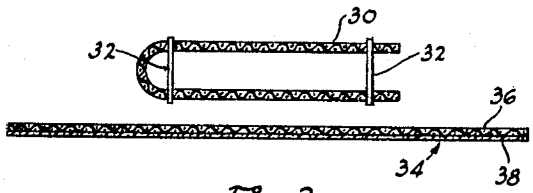
FIG. 2 is an exaggerated sectional view of the first operational step of forming one embodiment of lightweight harness in accordance with the principles of the present invention and in which a sheath of flexible, waterproof material completely encases the textile tensile layers of fabric.
Figures 3, 5:
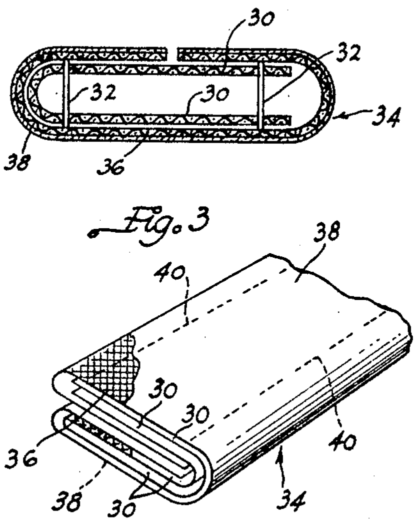
FIG. 3 is an exaggerated sectional view of the components shown in FIG. 2, but illustrating the second step in the formation of the composite product wherein the outer waterproof material has been bent around the interior tensile plies.
FIG. 5 is a fragmentary perspective view, somewhat exaggerated, of the finished product resulting from the steps illustrated in preceding FIGS. 2–4.

After the folded fabric member 30 is placed upon what ultimately is the inner surface of the waterproofing sheath material 34, as shown in FIG. 2, the outer edges of the sheath material 34 are folded inwardly upon themselves to the configuration shown in FIG. 3. This results in the tensile textile fabric 30 being substantially completely enclosed by the waterproofing sheath material 34. Following this arrangement, the composite structure shown in FIG. 3 is then folded once upon itself midway of the opposite edges to produce the exaggerated configuration shown in FIG. 4. This folded assembly is secured in folded condition by rows of stitching 40 adjacent opposite edges thereof.

It will be understood that when the material is stitched as illustrated, all of the plies will be compressed into very close and compact relationship with each other, whereby the exemplary product shown in FIG. 5, though still somewhat expanded in exaggerated manner in said figure, nevertheless will be relatively thin and, under normal conditions, less than 1/8" thick. Such product will actually comprise 4 plies of tensile textile fabric and if such plies, for example, are each 1/2" in width, the composite element will sustain at least 2000 lbs., which is far more than required, for example, for lines or reins employed in racing harness, yet is far less in weight than conventional leather reins or lines of standard size and quality, as well as being far greater in tensile strength than such leather lines.

Another advantage of forming harness members in the manner illustrated in FIGS. 2–5 lies in the fact that all of the cut, raw edges of both the tensile textile fabric and waterproofing sheath material are disposed inwardly of the composite product and only smooth, rounded edges are present on the product.

Figure 4:
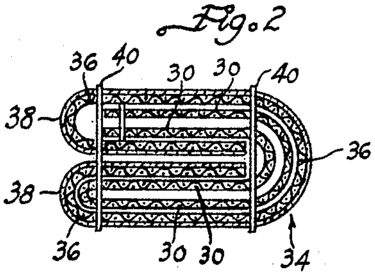
FIG. 4 is an exaggerated sectional view illustrating the final step following the step shown in FIG. 3 and in which final step the assembly shown in FIG. 3 is folded upon itself and then stitched adjacent opposite edges to form a harness element comprising 4 plies of tensile fabric and 4 plies of waterproofing covering material.
Figure 6:
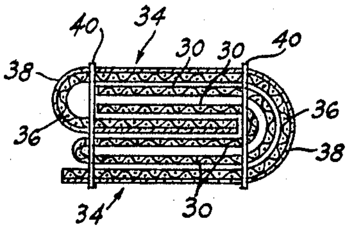
FIG. 6 is an exaggerated sectional view similar to FIG. 4, but illustrating a slightly different embodiment of harness element in which a total of 7 layers of material are arranged in ply form and stitched together, 4 of said layers being tensile textile material and 3 of them being waterproofing covering material.

If desired, especially for purposes of providing greater strength if necessary and to employ one less ply of waterproofing sheath material, for example, there is illustrated in FIG. 6 another embodiment of the present invention generally similar to the construction shown in FIG. 4, except that one of the innermost layers or plies of waterproofing sheath material is omitted, whereby at least at one edge of one surface of the composite product, there will be a raw edge of the sheath material 34.

Under certain circumstances, it may be desired to employ metallic clevises on U-shaped metal members to secure the clevises to one end of harness members such as traces, for example. In accordance with conventional practice, the U-shaped metal members are secured to one end of the traces by overlapping opposite surfaces of the traces with the legs of the metal members and fastening the assembly together by rivets. Referring to FIGS. 7 and 8, exemplary illustration of such an arrangement is shown wherein the fragmentary ends 42 of traces formed in accordance with the principles of the present invention have U-shaped metallic members 44 connected thereto by means of rivets 46. The U-shaped member 44 engages a pin 48 of a clevis 50.

In order not to decrease the tensile strength of the harness member, such as trace 42 when using rivets 46 to connect metallic members thereto, for example, one advantage offered by the present invention with respect to the use of textile fabric tensile members or means is that, rather than form holes to receive the rivets 46 by punching or cutting holes in the textile fabric, the weave of the fabric, including both the fabric 30 as well as the woven textile layer 63 of the sheath material 34, permits the crossed, woven fibers or filaments of the textile fabric to be rearranged or displaced by the use of a preferably pointed tool 52, shown in cross-section in FIG. 11, which is projected through the fabric to form a hole 54 by pushing aside, as it were, the warp and weft fibers or filaments illustrated somewhat diagrammatically in FIG. 11.

When forming holes such as the exemplary hole 54 in the various harness elements contemplated by the present invention by the means and method described immediately above, the rearrangement of the fibers and filaments of the woven textile material is accomplished substantially without appreciable rupture or severance of any of said fibers or filaments. However, to further insure substantially no weakening of the tensile strength of such harness members incident to forming such holes therein and to stabilize the holes, it is preferred that the holes be formed by pushing a heated pointed tool, such as tool 52, through the assembled plies of textile fabric in the various harness members. By such means, in the event any of the fibers or filaments should become ruptured or severed, the heated tool will effect at least limited melting of the fibers immediately surrounding the hole and thereby restore the fibers or filaments which possibly have become ruptured or severed into a continuous structure which is stable when cooled. Further, such heating of the rearranged or reshaped fibers immediately surrounding and defining the holes causes them to assume a permanent set and thereby stabilize the shape of such holes.

In addition to being used for purposes of receiving rivets and the like, such holes also are used to accommodate the tongues 56 of buckle members 58, for example, as shown in FIG. 10. Holes formed in accordance with the manner described above operate satisfactorily with minimum wear being sustained by the perimeters of the holes. Further, as a result of such rearrangement of the fibers immediately surrounding the holes, a thickening of the perimeters of such holes is caused, as shown in exemplary manner in FIG. 12. In addition to forming holes 54 for receiving the tongues 56 of buckles 58 or the like, it also is to be understood that any of the harness elements which are to be connected to said buckles in adjustable manner likewise may have a series of spaced holes 54 formed therein, by the method and means described above, for cooperation with the buckle 58 and receiving the tongue 56 of the buckle through a selected hole 54 of the strap-like harness element.

For purposes of illustrating at least limited details of the waterproofing sheath material 44, by reference to FIG. 13, it will be seen that the woven textile fabric 36 has a layer of reasonable thickness of suitable coating 38 of synthetic resin, lacquer, or the like, firmly and permanently united therewith and capable of preventing any appreciable passage of moisture therethrough.

In lieu of rendering the various harness elements waterproof by the formation of a sheath of material such as waterproofing material 34 around the exterior surfaces thereof, it also is contemplated in accordance with the principles of the present invention that another embodiment of basic structure for forming harness elements comprises the initial folding of tensile textile fabric 30 into a plurality of layers, such as an exemplary 8-ply configuration shown in FIG. 14. The plies are stitched into permanent shape and arrangement with each other by means of at least single rows of stitching 40 parallel to each other and adjacent the opposite edges of the exemplary harness member 60 shown in FIG. 14, and then such multi-ply harness member is coated, by spraying, brushing, dipping, or the like, with suitable pliable lacquer 62, or other preferably quick-drying waterproof coating compound or substance. Thereby, in addition to the inherent moisture-resistant nature of the textile fabric 32 itself, the examplary harness element 60, which may be any one of the various harness elements shown generally in the set of harness illustrated in FIG. 1, is rendered substantially completely resistant to the absorption of any appreciable amount of moisture without detracting from desirable flexibility inherently expected to be present in harness. Further, such coating may be suitably pigmented to produce desired aesthetic effects.

The coating 62 may be of relatively fluid consistency when applied to the exemplary member 60, whereby there is a tendency for the harness member to rather substantially absorb the fluid coating compound. A plurality of coats of such coating compound or material also may be applied successively to the harness member if desired or found necessary to produce the desired amount of resistance to the absorption of moisture. Further to improve the appearance of the harness element 60 so as to render it more comparable to the finish normally expected in leather harness, the coating 62 may be of a less liquid consistency than that referred to above, whereby a relatively smooth exterior, finished surface will be formed upon the coating 62, somewhat as shown in exemplary edge view in FIG. 15 in which there is also illustrated an end configuration 64, which may be formed by pinching or feathering the edge of the coating before it has finally dried, for example.

A slightly different embodiment of forming an exemplary harness element 60 from textile fabric is illustrated in exaggerated, expanded manner in FIG. 16. In this arrangement or configuration, a single strip of textile fabric of desired width is folded upon itself once so as to superimpose the opposite raw edges 66 thereof upon each other and then secure the same together by a row of stitching 68 shown in exemplary manner in FIG. 16. The opposite folded edge 70 and the stitched raw edges 66 then are folded inwardly upon the remainder of the double ply arrangement, from opposite edges thereof, substantially into meeting engagement.

The foregoing arrangement then is folded along its median line into the final configuration shown in FIG. 16 and such assembly, when compressed, is fixed in permanent shape by a pair of rows of stitching 72. An arrangement of this type may have the inherent moisture-resistance thereof improved, for example, by applying thereto a moisture-proof coating, such as lacquer 62 illustrated in FIGS. 14 and 15. Such a construction of exemplary harness member 60 as is illustrated in FIG. 16 comprises 8 superimposed plies and, depending upon the width of the plies and fabricated composite harness member, the tensile stress of such a member is very high, in accordance with the specific recitations of tensile strength set forth above.

While all of the various harness elements of the exemplary complete set of harness illustrated in FIG. 1 are important in that each serves its own individual function in the complete set, one of the more important elements, especially in accordance with the present invention, comprises the saddle 16. The saddle is a conventional set of harness and even of a set of so-called conventional lightweight racing harness, made from leather, preponderantly is the heaviest single element of the entire set of harness. Particularly when a conventional leather girth 18 is connected thereto, the average overall weight of a conventional leather saddle and girth is approximately 14 lbs. or more, whereas the total weight of a substantially complete set of harness usually is only about 17 lbs. or more. One reason for the saddle especially being heavy is that the conventional leather saddles of a set of racing harness include an internal metal bracing member extending within the saddle for an appreciable portion of the entire length thereof and weighs well over 1 lb. It is used primarily to brace the saddle and maintain it in a substantially predetermined fixed shape at all times, and to which metal guide rings for lines and metal hooks are connected.

In accordance with the present invention, the saddle 16 preferably comprises no metal elements at all, with the possible exception of several buckles. Said saddle comprises a covering consisting of two elongated strips of composite, multi-ply textile fabric 74 and 76. For example, 4 superimposed plies of textile fabric of the type described above are highly suitable for purposes of forming such covering members 74 and 76. The opposite edges of said members are stitched together by rows of stitching 78 and the stitched edges then are turned outside in so as to form a smooth exterior. The interior of said connected covering members then is stuffed relatively solidly with suitable cushioning material 80. One satisfactory type of stuffing 80 may comprise scrap textile material such as that from which the various harness elements are made, particularly since the same is quite resistant to the absorption of moisture.

Prior to stuffing the saddle 16, intermediately of the ends thereof, one or more rows of stitching 82 are made to extend transversely across the stitched covering after being turned outside in so as to form a hinge portion intermediately of the ends of the saddle. Then the saddle is filled to a desired extent with the stuffing 80, the outer ends 84 of the opposite halves 86 and 88 of the saddle preferably being feathered to a smooth, curved terminal end and finished by appropriate stitching.

Rather than employing conventional metallic guide rings for the lines or reins such as are carried by a conventional leather-type saddle, or metal hooks or the like to which crupper straps and check reins are fastened as on conventional leather-type saddles, the present invention preferably provides very lightweight but strong and durable guide and attaching means for such additional elements of a complete set of harness. Referring to FIGS. 17, 19 and 21 particularly, it will be seen that a relatively narrow strap-like element 90, of the order of approximately ½″ or ¾″ in width, extends along the outer covering member 76 of the saddle and is connected thereto intermediately of the edges thereof by rows of stitching 92 which are applied before the covering members 74 and 76 are connected to each other. At desired locations along the strap-like element 90, the stitching 92 is interrupted and the element is bulged outwardly to form guide loops or elements 94 for the lines or reins of the set of harness. Such loops may be reinforced by appropriate supplementary cross-stitching 96 shown in FIG. 19. Without restriction thereto, the strap-like element 90 may consist of 4 united plies of textile fabric.

Suitable loops 98 and 100 formed from material in an arrangement similar to the element 90 are formed and secured to the hinge portion of the saddle by appropriate stitching 102, thereby providing means respectively for connecting a check rein and crupper strap in lieu of metallic hook members or the like, thus further reducing the weight of the saddle as compared to conventional leather-type saddles.

The lower ends of the strap-like elements 90 may be sufficiently long that they can be reversed upon themselves to form loops 104 through which the forward end of shafts 106 of sulky 108 extend for support. Further, such loops are formed by means of appropriate buckles 110, it being understood that the loops 104 merely are exemplary and may be formed in any other suitable manner, as desired. Also, the shaft tugs 26, shown in exemplary manner in FIG. 1, are formed from suitable ply-fabric elements similar to strap-like element 90, for example, the outer ends thereof supporting suitable box loops 112, which receive the terminal ends of the shafts 106 and are used incident to backing the sulky 108. The box loops 112 likewise are formed from multi-ply textile material of a suitable thickness and formed from the same type of textile material as the other harness members described above.

Also connected to the lower terminal ends 84 of the saddle is a girth 18 which is of suitable appreciable width and formed from multi-ply textile material of a suitable number of layers stitched and otherwise secured together in accordance with the principles and type of material described above with respect to other items of the complete set of harness. The opposite ends of the girth 18 are secured appropriately by additional buckles 114 which, for example, may be carried by appropriate extensions 116, see FIG. 20, of the strap-like element 90, or otherwise, affixed to the saddle 16 by stitching or the like.

As will be seen particularly from the exemplary illustrations in FIGS. 9 and 10, the buckles 58, or the like, may be supported by loops 118 formed by connecting the end 120 of the exempary strap-like element 42, or otherwise, to the main portion of said element by a suitable pattern 122 of stitching. If desired, however, rivets may be employed which extend through holes formed in the manner described above with respect to the holes 54.

Further, another exemplary manner of connecting two strap-like elements, in accordance with the present invention, is illustrated in FIG. 9 wherein it will be seen that similar loops 124 and 126 are interconnected and the ends of the strap-like elements 128 and 130 upon which the loops are formed are secured respectively to said elements by appropriate stitching 132, although rivets may be used either in conjunction with or in lieu of such stitching, if desired, the rivets being applied as in regard to rivets 46 described above with respect to FIGS. 7 and 8.

From the foregoing, it will be seen that the present invention provides a set of lightweight harness which is composed substantially entirely of multi-ply fabric arrangements, the fabric being formed preferably from synthetic resin such as "nylon," "Orlon," or the like. Strips of such material are folded in any of a number of desired configurations described above and secured in permanent form by appropriate stitching or the like. Harness made in such manner is extremely light in weight, especially compared with conventional leather harness, such harness is highly resistant to absorption of moisture so that the weight thereof is not increased to any noticeable extent when contacting sweat upon an animal or during inclement weather, and the tensile strength of all elements of the harness is far greater than comparable leather elements of conventional harness. As a result of using harness of this type, a horse can apply substantially its entire energy to forward movement as distinguished from having to support a substantial amount of dead weight as when fitted with conventional leather harness, even of the so-called lightweight type.

Particularly by eliminating substantially all metal elements from the harness, with the exception of buckles, and especially by eliminating the metallic reinforcing elements, guide rings and hooks normally employed in conventional leather-type saddles, the total weight of a complete set of harness is reduced from at least approximately 17 lbs. or more, which is the weight of conventional leather harness, to less than 4 lbs. when not including the weight of the metallic bit on the bridle in either of these total weights.

While the invention has been described and illustrated in its several preferred embodiments, it should be understood that the invention is not to be limited to the precise details herein illustrated and described since the same may be carried out in other ways falling within the scope of the invention as claimed.

I claim:

1. A lightweight saddle for a set of harness, said saddle being free of metal bracing and comprising a covering of a plurality of closely overlying plies of moisture-resistant textile fabric woven from synthetic resin filaments having high tensile strength, said covering being stuffed with material to provide desired cushioning characteristics and shape thereto, and loop means comprising a relatively narrow strip of multi-ply material similar to that from which said covering is formed and stitched longitudinally to the upper surface of said stuffed saddle covering, said strip being spaced from said upper surface of said covering at intervals to provide loops for guiding lines when extended therethrough and to connect reins and the like thereto, whereby said stuffing and stitching solely impart shape to said saddle, thereby rendering the same light in weight.

2. The saddle according to claim 1 in which said narrow strip of material is connected to said saddle covering by longitudinal stitching and said stitching being interrupted to form said guiding and connecting loops.

3. The saddle according to claim 1 in which the stuffing of said saddle is omitted intermediately of the ends thereof and the top and bottom portions of said covering being stitched together at said intermediate portion to form hinge means for said saddle to permit ready accommodation thereof to the back of an animal.

4. The saddle according to claim 3 further including loops of narrow strips of multi-ply fabric similar to that from which said covering of said saddle is formed and secured to and extending in opposite transverse directions from said hinge portion of said saddle, thereby providing connecting means for check reins, crupper straps and the like.

References Cited by the Examiner

UNITED STATES PATENTS

| | | | |
|---|---|---|---|
| 934,304 | 9/1909 | Gooing | 54—2 |
| 1,157,755 | 10/1915 | Benjamin | 139—383 |
| 1,678,373 | 7/1928 | Wiesenfeld | 54—23 |
| 2,967,816 | 11/1960 | Reed | 54—24 |

SAMUEL KOREN, *Primary Examiner.*

HUGH R. CHAMBLEE, *Examiner.*